Oct. 20, 1970 H. A. BEALL, JR 3,535,527
DIGITAL CORRELATION PATTERN TRACKER WITH SINGLE AXIS SCANNING
Filed April 26, 1968
2 Sheets-Sheet 1

INVENTOR.
HORACE A. BEALL JR.
BY L. Lee Humphries
ATTORNEY

INVENTOR.
HORACE A. BEALL JR.
BY L. Lee Humphries
ATTORNEY

United States Patent Office 3,535,527
Patented Oct. 20, 1970

3,535,527
DIGITAL CORRELATION PATTERN TRACKER
WITH SINGLE AXIS SCANNING
Horace A. Beall, Jr., Santa Ana, Calif., assignor to
North American Rockwell Corporation
Filed Apr. 26, 1968, Ser. No. 724,428
Int. Cl. H01j 39/12
U.S. Cl. 250—209                                11 Claims

ABSTRACT OF THE DISCLOSURE

A pattern tracker having non-parallel photosensitive surfaces located in the focal plane of a telescope which is adapted for dithering about a single axis. As the telescope reciprocates, the pattern image crosses the photosensitive surfaces. The time occurrence of pattern crossings of each surface in successive scans is a measure of pattern motion in the focal plane. The time of passage past the photosensitive surfaces of each portion of a pattern is determined by digitizing time increments of each photosensitive surface's output and comparing the digitized output of a scan to the output from a previous scan.

BACKGROUND OF THE INVENTION

Field of the invention

The present invention relates to a pattern tracker for measuring the motion in two axes of an arbitrary energy pattern and more particularly to a device which provides the two axis measure of pattern motion from only a single axis scan of the pattern.

Description of prior art

In sensing and tracking arbitrary light patterns, difficulties have long been encountered in developing systems with sensor portions simple enough to provide high performance reliability and computer portions small enough to satisfy size and weight requirements which may be presented, for example, by airborine systems.

Since the pattern to be tracked is arbitrary, that is, not necessarily predefined as where you are tracking an unknown terrain pattern, the sensor configuration must be capable of providing information about a wide variety of random patterns.

Typically, pattern trackers image the pattern to be tracked by a conventional telescope or other focusing means into a reticle or photosensor array in the focal plane. In one prior art approach, an image is divided into $N$ resolution elements in each axis or a total of $N^2$ elements. The pattern is then defined by the light level at each of the $N^2$ resolution element positions. The tracking techniques utilized involves measuring and storing the intensity of each of the $N^2$ elements at time $T_1$ and then repeating the pjrocess at a later time $T_2$. The two stored patterns are then shifted with respect to each other until the position of maximum cross correlation is found. The amount of shift required in each axis to achieve maximum cross correlation is a measure of the image motion in the time $T_2-T_1$. This technique is feasible but requires considerable sensor and electronic complexity requiring a minimum of $N^2$ sensor elements and a computer system capable of storing and comparing a minimum of $2N^2$ information bits. In addition, the complexity of the correlation process is substantially increased by relative rotation of the photosensor array with respect to the tracked pattern between successive measurements.

A method for significantly reducing the sensor complexity and required computer capacity is described in a copending application to John J. Fischer Ser. No. 720,435 filed Apr. 4, 1968, assigned to the assignee of the present application. In that application there is disclosed a technique of using a minimum of only two orthogonal strip shaped photosensor elements. Each photosensor strip is scanned in an orthogonal direction giving an analog signal which represents the pattern in the scan direction but averaged over the orthogonal direction. The output of each cell is filtered, time digitzed and stored in a shift register. The pattern is then scanned again in the same manner at a later time and the later signal is also filtered, time digitized and stored. The two words from each respective scan are then compared by digital correlation, shifted one bit and compared again. This is continued for the number of bits equal to the greatest anticipated image drift between scans. The correlation value of each comparison is stored. At the completion of the shifting and comparing the number of required shifts to achieve maximum correlation is read out as the image drift between scans. While this technique provides significant advantages in that the sensor and computer complexity is significantly reduced, the requirement that two successive scans be completed for each orthogonal direction, thus requiring a total of four scans for one complete two axis correlation, is disadvantageous for some applications. The sensor and associated computer equipment limit the maximum practicable scan rate while the anticipated maximum pattern drift between scans establishes a minimum required scan rate. Where the maximum allowable scan rate is less than the minimum required scan rate, complex adjustments must be made to the scan mechanism to compensate for the anticipated extraordinary pattern drift.

SUMMARY OF THE INVENTION

According to the present invention, a unique approach for the measuring of motion in two axes of an arbitrary light pattern is undertaken wherein only single axis scanning is required. Two strip shaped photocells or field stops are arranged in the focal plane of a focusing telescope at angle $\psi$ and $\theta$ from the axis perpendicular to the scan direction. The pattern image is caused to be moved repetitively back and forth across the photocells in the scan direction. The photocell outputs are amplified, filtered and fed to a digitizer which chops the signal into a predetermined number of discrete time intervals and provides a digital output representative of the signal level experienced within each time interval, thus dividing the signal into a binary word synchronized with a system clock.

The binary words from the first scan are stored in shift registers in a correlator. Each time the target is scanned, the digital words produced are compared to the corresponding words from the previous scan in the same direction to determine the amount of displacement between scans. Each bit of a word is compared to the corresponding bit of the corresponding previous word independent of all other bits. If the values of the bits are alike, a "0" is written for the sum, if different a "1" is written. The number of "1's" is then counted and stored. The second word is then shifted one bit and the process repeated. Additional shifts are made and the counts stored. When the counts have been completed for all allowable shifts, the best matched is the position which produced a minimum number of "1's." The process is repeated for each successive scan by shifting the last word to the old word position and comparing with the new word. The correlator outputs are digital numbers indicating the number of shifts required to match words from successive scans. These shifts represents displacements along both axes. Since the photosensors are at angles from the X and Y axes, these outputs are resolved into X and Y drifts.

OBJECTS

It is therefore an object of this invention to provide a novel pattern tracker.

It is a further object of the invention to provide a pattern tracker characterized by simplicity of sensor elements and associated electronic circuitry.

It is still a further object of the present invention to provide a pattern tracker wherein only single axis scanning is required.

It is another object of the present invention to provide a pattern tracker where movement of an arbitrary pattern tracker where movement of an arbitrary pattern in the X and Y directions may be discerned by scanning the pattern in only a single direction.

Still other objects, features and attendant advantages of the present invention will become apparent to those skilled in the art from a reading of the following detailed description of several embodiments constructed in accordance therewith taken in conjunction with the accompanying drawings.

DESCRIPTION OF THE PREFERRED EMBODIMENTS

Figure 1A:
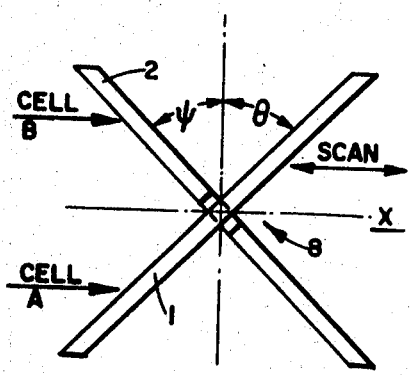
FIG. 1a is a schematic diagram of a sensor configuration constructed in accordance with the principles of the present invention wherein a cross pair of sensor strips are disposed so as to sweep the same pattern.

Referring to FIG. 1a, there is illustrated a photosensor array constructed according to the principles of the present invention. Two photocells A and B, represented by photosensor strips 1 and 2, are arranged in image plane 8 at angles $\theta$ and $\psi$ from the axis perpendicular to the scan direction. Image plane 8 may be any surface upon which an image or other representation of an arbitrary pattern is present. Sensor strips 1 and 2 may preferaoly be supported by a substrate member such as, for example, ceramic or glass. The two electrically isolated photoelectric surfaces may be placed directly on the substrate member. Alternately, a surface of photoelectric material may be placed over the entire surface of the substrate and than masked with a material such as gold to display the two surfaces of photoelectric material. Electrical isolation of the two exposed strips woud be required. Another alternative is to use a beam splitter in the optical system and have the two elements physically separated. The photosensor material may, for example, comprise cadium sulfide, silicon, or other photosensor material, the choice to be determined on the basis of the anticipated frequency spectrum of the pattern to be sensed. The present invention is not limited to optical wavelength pattern tracking and, therefore, sensor materials capable of sensing wavelengths in the ultraviolet or infrared regions may also be used.

The angles $\theta$ and $\psi$ may assume any value greater than 0° and less than 90°, although values on the order of 45° are preferred. In addition, data processing requirements are reduced by making $\theta$ and $\psi$ equal.

The operation of the sensor array illustrated in FIG. 1a will be described using FIG. 2, which is a schematic block diagram of an example pattern tracking system.

Figure 2:
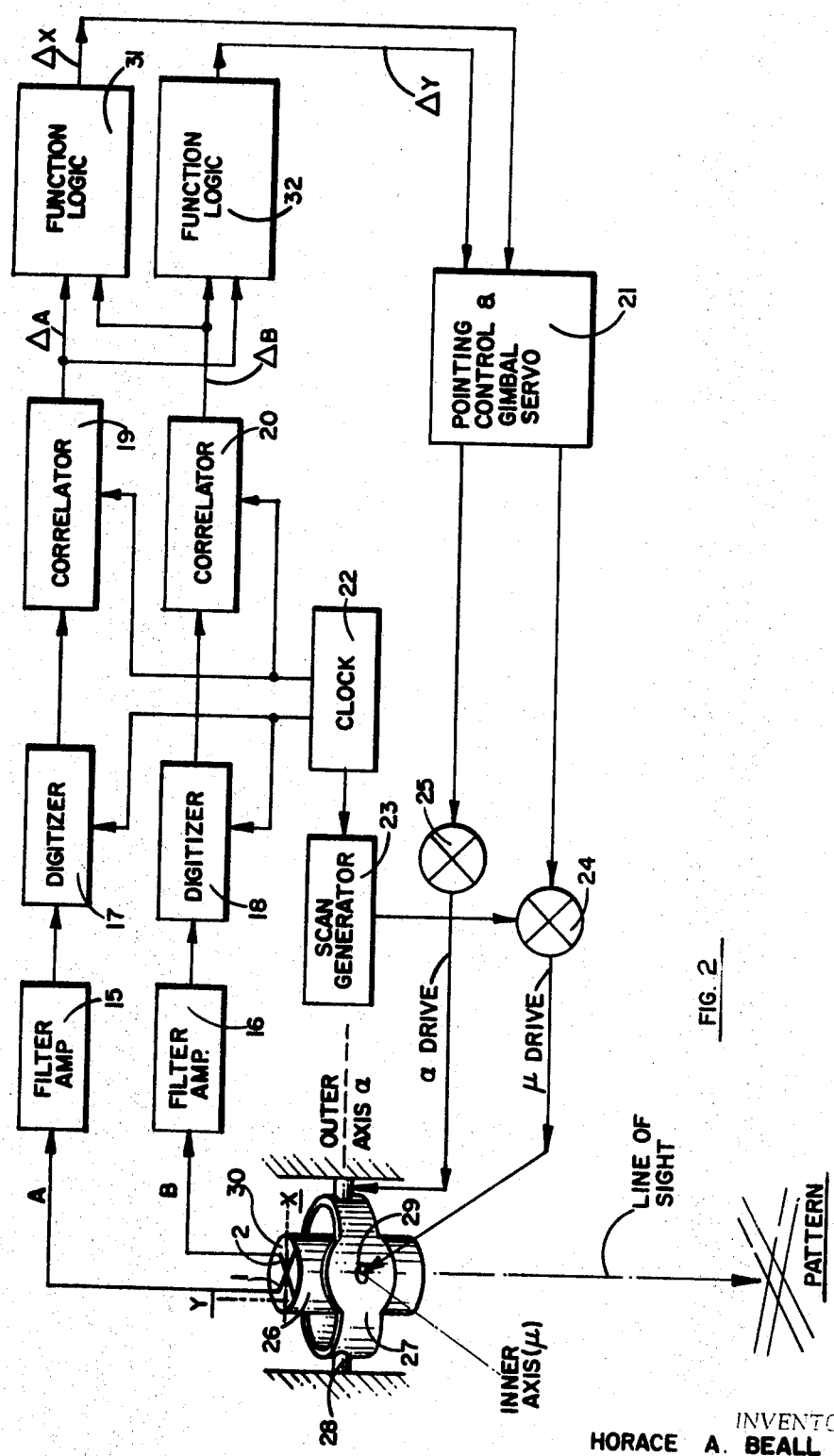
FIG. 2 is a block diagram of typical electronics adapted to be used in this invention to generate a signal which is indicative of the position of a pattern on the focal plane of a telescope and drive the telescope in relation to the indicated position.

Referring now to FIG. 2, sensor strips 1 and 2 are shown disposed in image plane 30 of telescope 26. Telescope 26 is supported about inner gimbal axis $\mu$ and outer gimbal axis $\alpha$. Telescope 26 is initially pointed at a desired area by pointing control and gimbal servo 21 which provides signals to inner and outer axes torquers 24 and 25, respectively. Scan generator 23 then provides signals to torquer 24 which drives inner gimbal axes $\mu$ so that the pattern image moves at a known rate synchronized by system clock 22 repetitively back and forth across photocells 1 and 2 in the X direction. Alternatively, an optical element such as a mirror or prism may be utilized to sweep the image over the sensor array. As each scan progresses, the output of each photosensor is first amplified and then filtered in filter amplifiers 15 and 16. The characteristics of the filtering portion of 15 and 16 will depend upon the system requirements. The higher frequencies more sharply define a pattern but contain a higher component of noise than do the lower frequencies which, however, do not convey the sharp details of the pattern. This mitigates towards choosing an intermediate frequency range.

Figure 3:
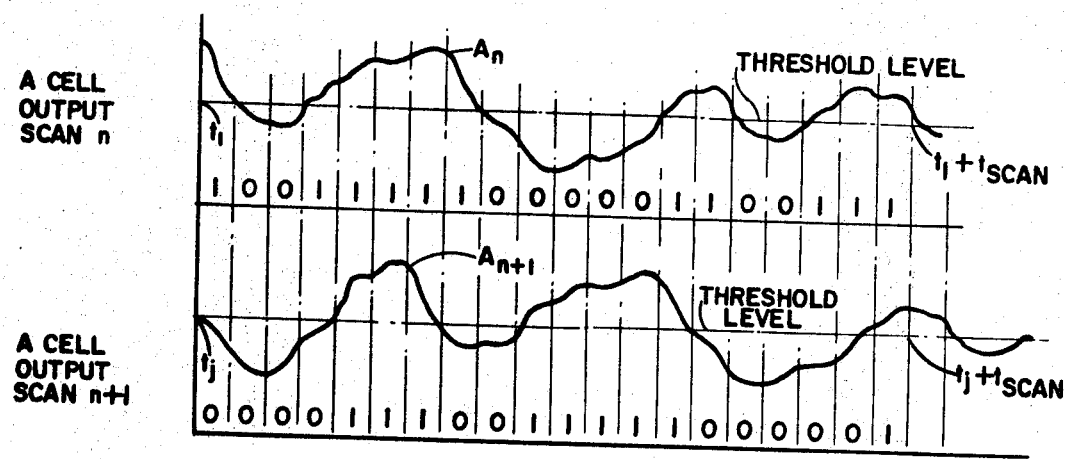
FIG. 3 is a sketch of a pair of typical waveforms which might be generated by a photosensor strip of FIG. 2 during two successive scans.

The outputs of filter amplifiers 15 and 16 are fed into digitizers 17 and 18. Referring to the output of photosensor 1, digitizer 17 compares the output of photosensor 1 at intervals of time synchronized by system clock 22 to some threshold electrical current value. The threshold level may be preset or controlled by the analog signal by using an RMS to D.C. converter which may be incorporated in digitizer 17. This assures that the output signal will always contain an appropriate ratio of signals above and below the threshold value. If the signal exceeds the threshold, a "1" is written in the bit position in a digital register, contained in correlator 19, corresponding to the time increment involved. If the current falls below the threshold, a "0" is written in the corresponding bit position in correlator 19. Thus, a digital word describing the light intensity silhouette of the area scanned at an angle $\psi$ to the Y axis is produced. Each element of this silhouette is a function of the total amount of light impinging upon the entire photosensor strip 1 during the time increment. Illustrated in FIG. 3 are two typical waveforms produced by successive scans of photosensor strip 1. Waveform $A_n$ is the waveform resulting from scan $n$ commencing at time $t_1$ and concluding at time $t_1 + t_{scan}$. $t_{scan}$ is the time required for a single complete scan in, say the $+X$ direction. Waveform $A_{n+1}$ illustrates a typical output from scan $n+1$ commencing at time $t_j$ and terminating at time $t_j + t_{scan}$.

As illustrated in FIG. 3, the resulting waveforms are segmented into equal increments of time and compared during each such time increment to a threshold level. The bit values for each time increment are shown below the waveforms. For convenience, twenty such increments have been illustrated.

Referring once again to FIG. 2, each time strip 1 is scanned the digital word produced is stored in a register in correlator 19 and compared to the corresponding word from the previous scan. The comparison process carried out is termed modulo-two addition and is designed to determine the displacement of the silhouette pattern from the preceding scan. The process may be described as follows: Correlator 19 compares each bit of a word to the corresponding bit of the corresponding word from the previous scan, independent of all other bits. If the values of the bits compared are alike, a "0" is writen for the sum; if different a "1" is written. The process is equivalent to disabling the carry capability of a digital add register and simply adding. The number of "1's" is then counted and stored in correlator 19. The latter scan word is now shifted one bit and the process repeated. Additional shifts are made and differences noted. When the normalized differences are found and "1's" counted for all allowable shifts, the best match is the position which produced the minimum number of "1's." The process is repeated for each successive scan by shifting the last word to the old word position in correlator 19 and comparing it with the new word. The pattern size and number of intervals into which each scan is broken is selected so that an appreciable word overlap exists at all times because the information content diminishes as the difference word gets shorter. This is accomplished by designing the scan pattern, word length, and bit size in accordance with the maximum anticipated displacement per scan cycle and the resolution desired.

The above procedure is concurrently carried out with respect to photosensor strip 2 utilizing correlator 20. The correlator outputs $\Delta A$ and $\Delta B$ are digital numbers indicating the shifts required to match words from successive scans. Since the photosensors are at angles $\phi$ and $\psi$ from the Y axis, $\Delta A$ and $\Delta B$ each represent displacements along both axes. These outputs are next resolved into X and Y drifts. The equations for the X and Y drifts are:

(1) $$\Delta X = \frac{\Delta A + \Delta B + (\Delta B - \Delta A)\left(\frac{\tan\theta - \tan\Psi}{\tan\theta + \tan\Psi}\right)}{2}$$

(2) $$\Delta Y = \frac{\Delta B - \Delta A}{\tan\theta - \tan\Psi}$$

where $\theta = \psi$ the equations simplify to:

(3) $$\Delta X = \frac{\Delta A + \Delta B}{2}$$

(4) $$\Delta Y = \frac{\Delta B - \Delta A}{2 \tan\theta}$$

where $\Delta A$ and $\Delta B$ represent the distances along the X axis (scan axis) corresponding to the number of shifts required to match successive scans of photosensor strips 1 and 2. The computations may be implemented by conventional function logic contained in boxes 31 and 32. The outputs of boxes 31 and 32 represent the pattern motion in two orthogonal coordinates from each scan cycle to the succeeding scan cycle. These outputs can be used directly or, as illustrated, fed into pointing control and gimbal servo 21 to cause telescope 26 to perform a function such as centering on the pattern after each successive scan or series of scans. In addition, the angle of the line of sight to the pattern may be obtained by mounting conventional angle readouts, not illustrated, on gimbal axes $\mu$ and $\alpha$.

While the invention has been described in relation to a single threshold to which the output of each photosensor is compared during discrete intervals of time, such is not a necessary constraint. Two or more discrete threshold levels may be concurrently utilized. The output of each photosensor would then be compared during each discrete interval of time to each of the various threshold levels and a multi bit word stored in the register representing each interval of time. The correlator would then compare each multi bit word from a successive scan to the multi bit word of the proceding scan in the same manner as previously described.

Each photocell generates two outputs for each cycle of the reciprocating scan, one for the +X scan and one for the return. These two words may not correlate well due to the difference in scan direction. If information rate is not important, the signals for one direction can be gated out and ignored. Alternatively, both scan directions can be correlated independently by the use of additional correlators and combining logic.

Figure 1C:
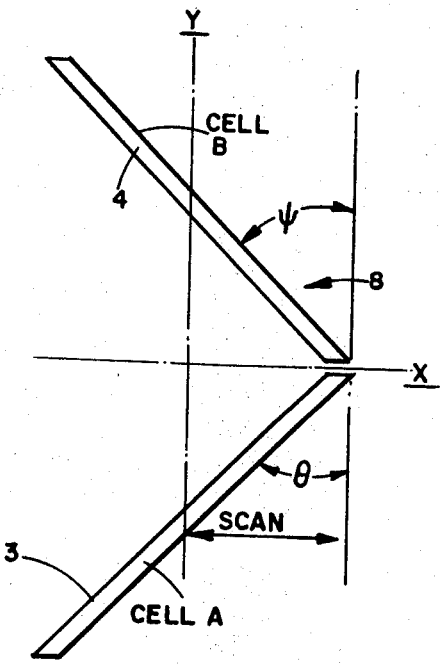
FIG. 1c is a schematic diagram of yet another embodiment of a sensor configuration constructed in accordance with the principles of the invention wherein a pair of non-crossed sensors are disposed so as to sweep two different patterns.
Figure 1B:
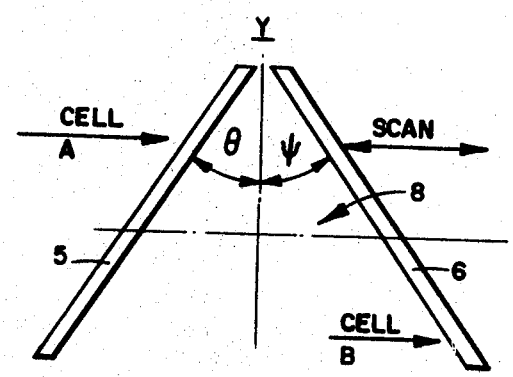
FIG. 1b is a schematic diagram of a second embodiment of a sensor configuration constructed in accordance with the principles of the invention wherein a pair of non-crossed sensor strips are disposed so as to sweep the same pattern.

Illustrated in FIGS. 1b and 1c are alternate photosensor array configurations constructed according to the principles of the present invention. FIG. 1b shows non-intersecting photosensor strips 5 and 6 arrayed in an image plane at angles $\theta$ and $\psi$ from the axes perpendicular to the scan direction. The embodiment of FIG. 1b makes it easier to effect electrical isolation between photocells A and B. In FIG. 1c, there is shown non-intersecting photosensor strips 3 and 4 arrayed in an image plane at angles $\theta$ and $\psi$ from the axis perpendicular to the scan direction. As can be seen, however, each photocell in FIG. 3 scans a different pattern during a scan. Photocell B scans the +Y quadrants while photocell A scans the −Y quadrants. It is therefore necessary when utilizing the configurations of FIG. 1c to assure that patterns are simultaneously present in the +Y and −Y quadrants.

It will be seen that the several embodiments described above provide unique pattern scanners which have distinct and practical advantages in that two axis determinations of pattern drift may be determined from only single axis scanning. The required sensor, electronic and drive mechanism complexity is greatly simplified over prior art devices, allowing for a substantial reduction in size, weight and cost over previous concepts.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments but only by the scope of the appended claims.

I claim:

1. A system for determining motion of a pattern comprising in combination:

detection means for repetitiously scanning the pattern in one axial direction, said detection means providing a digital output indicative of the pattern, said detection means comprising at least two strip shaped photosensors disposed at angles $\theta$ and $\psi$ from the axis perpendicular to the scan direction wherein the absolute values of said angles $\theta$ and $\psi$ are greater than 0° and less than 90°;

digitizing means for receiving the outputs of each of said photosensor strips and comparing each of said outputs to at least one reference level during successive discrete intervals of time during a scan, producing as an output, digital words indicative of the relation of each sensor's output to said reference level during each of said discrete intervals of time;

means for shifting the digital output of a scan; and correlation means for correlating the shifted digital output of a scan with the output obtained by a previous scan, the amount of shift required for optimum correlation being a function of the motion of the pattern.

2. The system of claim 1 wherein said correlation means comprises:

means for storing the digital words produced by at least two successive scans;

said shifting means comprising means for repeatedly shifting the digital words resulting from a later scan in relation to the corresponding digital words resulting from the immediately preceding scan;

means for comparing the digital words resulting from the later scan to the corresponding words from the immediately preceding scan, said comparison effected for each shifted position of said later scan words.

3. The system of claim 2 wherein said comparing means comprises:

means for modulo-two adding each bit of a word from a later scan to the corresponding bit of the corresponding word from the immediately preceding scan, said adding means producing outputs indicative of the total number of modulo-two additions wherein the corresponding bit values of corresponding words are dissimilar.

4. The system of claim 3 further comprising:

means for determining which shifted position of each later scan word minimizes said adding means output, the number of shifts required to achieve said shifted position being a function of the motion of the pattern between the time of said later and said immediately preceding scan.

5. The system of claim 4 further comprising: function logic means receiving the ouptut of said determining means for evaluating equations of the form:

$$\Delta X = \frac{\Delta A + \Delta B + (\Delta B - \Delta A)\left(\frac{\tan\theta - \tan\psi}{\tan\theta + \tan\psi}\right)}{2}$$

and, $$\Delta Y = \frac{\Delta B - \Delta A}{\tan\theta + \tan\psi}$$

wherein $\Delta A$ and $\Delta B$ are the number of shifts required to minimize said adding means outputs and wherein $\Delta X$ and $\Delta Y$ represent pattern motion between a later scan and a preceding scan.

6. The system of claim 5 wherein the absolute values of said angles $\theta$ and $\psi$ are equal.

7. Apparatus for digitally representing an arbitrary pattern image comprising in combination:
   at least two strip shaped sensor cells disposed at angles $\theta$ and $\psi$ from the axis perpendicular to a scan direction, the absolute value of said angles $\theta$ and $\psi$ being greater than 0° and less than 90°;
   drive means for providing relative movement between said sensor cells and the pattern image causing said sensor cells to scan the pattern;
   digitizing means receiving the outputs of said sensor cells and comparing said outputs to at least one threshold level during successive discrete intervals of time, said digitizing means providing as an output digital words indicative of the relation of each sensor cells' output to said threshold level during each of said discrete intervals of time.

8. A method for determining the motion of a pattern which comprises:
   (a) repetitiously scanning the pattern in one axial direction with strip shaped sensor cells, said cells disposed at angles $\theta$ and $\psi$ from the axis perpendicular the scan direction, the absolute values of said angles $\theta$ and $\psi$ being greater than 0° and less than 90°;
   (b) comparing the output of each of said sensors to at least one reference level during successive discrete intervals of time during a scan thereby producing digital words indicative of the relation of each sensor's output to said reference level during each of said successive discrete intervals of time;
   (c) correlating by modulo-two addition each word of a scan to the corresponding word from the previous scan;
   (d) shifting words of said scan in relation to corresponding words of said previous scan;
   (e) repeating steps (c) and (d) above and determining the amount of shifting required for maximum correlation.

9. In a telescope tracking system wherein an image of a pattern to be tracked is directed into the focal plane of the telescope and wherein said telescope is adapted to dither to scan the image in an axial direction across said focal plane, means for determining motion of said pattern in said focal plane comprising:
   an array of at least two photosensor strips disposed at angles $\theta$ and $\psi$ from the axis perpendicular to the scan direction, the absolute values of said angles $\theta$ and $\psi$ being greater than 0° and less than 90°;
   means for repetitiously dithering said telescope to cause said image to repetitiously sweep across said photosensor array, thus repetitiously scanning said image across said sensor array;
   digitizing means for receiving the outputs of each of said photosensor strips and comparing each of said outputs to at least one reference level during successive discrete intervals of time during a scan, producing as an output, digital words indicative of the relation of each sensor's output to said threshold level during each of said discrete intervals of time;
   means for repeatedly shifting the digital words resulting from a later scan in relation to the corresponding digital words resulting from a preceding scan;
   means for correlating the digital words resulting from said later scan with the corresponding words from said preceding scan, said correlation effected for each shifted position of said corresponding later scan words;
   means for determining which shifted position of said later scan words results in maximum correlation with said corresponding preceding scan words, the number of shifts required to achieve said shifted position being a function of the motion of said pattern in said image plane between said later and said preceding scan.

10. The system of claim 9 further comprising: function logic means receiving the output of said determining means for evaluating equations of the form:

$$\Delta X = \frac{\Delta A + \Delta B + (\Delta B - \Delta A)\left(\frac{\tan\theta - \tan\psi}{\tan\theta + \tan\psi}\right)}{2}$$

and, $$\Delta Y = \frac{\Delta B - \Delta A}{\tan\theta + \tan\psi}$$

wherein $\Delta A$ and $\Delta B$ are the number of shifts of said later scan words required for maximum correlation with said corresponding prior scan words and wherein $\Delta X$ and $\Delta Y$ represent pattern motion between said later scan and said prior scan.

11. The system of claim 10 wherein the absolute values of said angles $\theta$ and $\psi$ are equal.

References Cited
UNITED STATES PATENTS

| | | | |
|---|---|---|---|
| 2,866,373 | 12/1958 | Doyle et al. | 250—209 X |
| 2,967,470 | 1/1961 | Willits et al. | 356—29 |
| 3,184,847 | 5/1965 | Rosen | 250—202 X |
| 3,273,124 | 9/1966 | Greanias | 250—202 X |
| 3,435,231 | 3/1969 | Griffths et al. | 250—201 |

ARCHIE R. BORCHELT, Primary Examiner

C. M. LEEDOM, Assistant Examiner

U.S. Cl. X.R.

235—181; 250—202, 220; 356—181